(12) United States Patent
Smoyer et al.

(10) Patent No.: US 8,769,577 B2
(45) Date of Patent: Jul. 1, 2014

(54) SYSTEM AND METHOD FOR PROVIDING FAST CHANNEL SURFING

(75) Inventors: Clinton J. Smoyer, Raymore, MO (US); Shane M. Smith, Paolo, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1056 days.

(21) Appl. No.: 11/803,899

(22) Filed: May 15, 2007

(65) Prior Publication Data

US 2008/0288979 A1 Nov. 20, 2008

(51) Int. Cl.
*H04N 5/455* (2006.01)

(52) U.S. Cl.
USPC .................................. 725/41; 725/37; 725/38

(58) Field of Classification Search
None
See application file for complete search history.

(56) References Cited

U.S. PATENT DOCUMENTS

| | | | | |
|---|---|---|---|---|
| 6,005,562 | A * | 12/1999 | Shiga et al. | 715/721 |
| 6,268,849 | B1 * | 7/2001 | Boyer et al. | 725/40 |
| 6,425,129 | B1 * | 7/2002 | Sciammarella et al. | 725/38 |
| 6,594,826 | B1 * | 7/2003 | Rao et al. | 725/95 |
| 6,721,953 | B1 * | 4/2004 | Bates et al. | 725/39 |
| 6,738,983 | B1 * | 5/2004 | Rao et al. | 725/120 |
| 7,053,964 | B2 * | 5/2006 | Moon | 725/32 |
| 7,080,394 | B2 * | 7/2006 | Istvan et al. | 725/43 |
| 7,299,484 | B2 * | 11/2007 | Thompson | 725/38 |
| 7,693,869 | B2 * | 4/2010 | Hutson et al. | 707/802 |
| 8,589,977 | B1 * | 11/2013 | Frusciano | 725/45 |
| 2002/0070958 | A1 * | 6/2002 | Yeo et al. | 345/723 |
| 2003/0074662 | A1 * | 4/2003 | Istvan et al. | 725/38 |
| 2003/0126605 | A1 * | 7/2003 | Betz et al. | 725/39 |
| 2004/0034863 | A1 * | 2/2004 | Barrett et al. | 725/38 |
| 2006/0031916 | A1 * | 2/2006 | Colter et al. | 725/135 |
| 2006/0064721 | A1 * | 3/2006 | Del Val et al. | 725/41 |
| 2006/0075428 | A1 * | 4/2006 | Farmer et al. | 725/38 |
| 2006/0259927 | A1 * | 11/2006 | Acharya et al. | 725/61 |
| 2007/0011350 | A1 * | 1/2007 | Lu et al. | 709/238 |
| 2007/0107026 | A1 * | 5/2007 | Sherer et al. | 725/97 |
| 2007/0283397 | A1 * | 12/2007 | Scholl | 725/86 |
| 2007/0300252 | A1 * | 12/2007 | Acharya et al. | 725/25 |

* cited by examiner

*Primary Examiner* — Brian T Pendleton
*Assistant Examiner* — Fernando Alcon
(74) *Attorney, Agent, or Firm* — Swanson & Bratschun, L.L.C.

(57) ABSTRACT

A system and method for enabling television watchers to "channel surf" faster and reduce the amount of bandwidth used over a network to communicate television channels to end-users. Electronic programming guide information and images associated therewith may be communicated to an end-user. An image associated with a video program may be displayed on an electronic display (e.g., television) in response to an end-user selecting a channel prior to video programming being displayed. By displaying an image prior to the video programming, the end-user may determine whether he or she wants to watch the video program prior to the video programming being displayed, which improves the speed of "channel surfing." Because end-users can view the image when selecting a channel, a network can be configured to distribute the channels that are currently being watched rather than distributing many on a continuous basis, thereby preserving bandwidth.

6 Claims, 6 Drawing Sheets

SYSTEM AND METHOD FOR PROVIDING FAST CHANNEL SURFING

BACKGROUND OF THE INVENTION

Conventional broadcast television operates by video content (e.g., television shows) being communicated over analog broadcast frequencies, commonly known as channels. Broadcasters of conventional television schedule the video content, commonly known as programming (hereinafter "video programming"), so that viewers of the television channels can watch a certain program at a certain time. For example, a broadcaster may schedule a television show on a certain day and at a certain time (e.g., Seinfeld, Thursday, 7:00 PM Channel 5, ABC network). With conventional television being broadcast over public airwaves with high bandwidth, a viewer selects a channel on a television, which causes a television receiver to tune to a frequency associated with the selected channel. The television receiver receives broadcast signals being broadcast at that broadcast frequency. Once received, the television displays the video content being received on the channel. As is appreciated by conventional television viewers, the time between selecting a channel and displaying the video content of the channel is substantially instantaneous. And, as is appreciated by conventional television broadcasters, the cost to broadcast the video content to a large number of viewers (e.g., an entire city is primarily limited to the cost of setting up a broadcast tower and video distribution equipment to that tower.

As the information age has developed, so has television. Viewership of conventional broadcast television has significantly decreased since cable and satellite television has become widely available. With cable and satellite networks, set top boxes were developed to operate as tuners and provide interactive programming guides for subscribers. The set top boxes operate by receiving digital signals representative of the content on each of the channels being communicated thereto. The set top boxes further operate by receiving and storing the programming guide information and enabling viewers to view the programming guide information to select a television channel by using a remote control that interacts with the set top box. Because the number of television channels has increased from less than ten with conventional television to hundreds of channels on both cable and satellite television, using the programming guide enables viewers to quickly browse through the television programs.

While the programming guide is helpful to viewers, there are viewers who want to casually browse the television programs being broadcast by simply changing the channels using an up and down channel selector on a remote control, as was traditionally done with conventional television before programming guides were available. This is commonly known as "channel surfing." Channel surfing on televisions that have set top boxes is significantly slower than the channel surfing experience with conventional television. While display of video programming was substantially instantaneous with conventional broadcast television, display of video programming on set top box television (e.g., IPTV and satellite) has a delay of about two seconds. One reason for channel surfing being significantly slower than conventional television is the time delay for the set top boxes to request, access, and convert the digital content into viewable images. Another reason for the delay is the relatively low bandwidth of the communication mediums given the amount of data used for communicating the video content.

Figure 1:
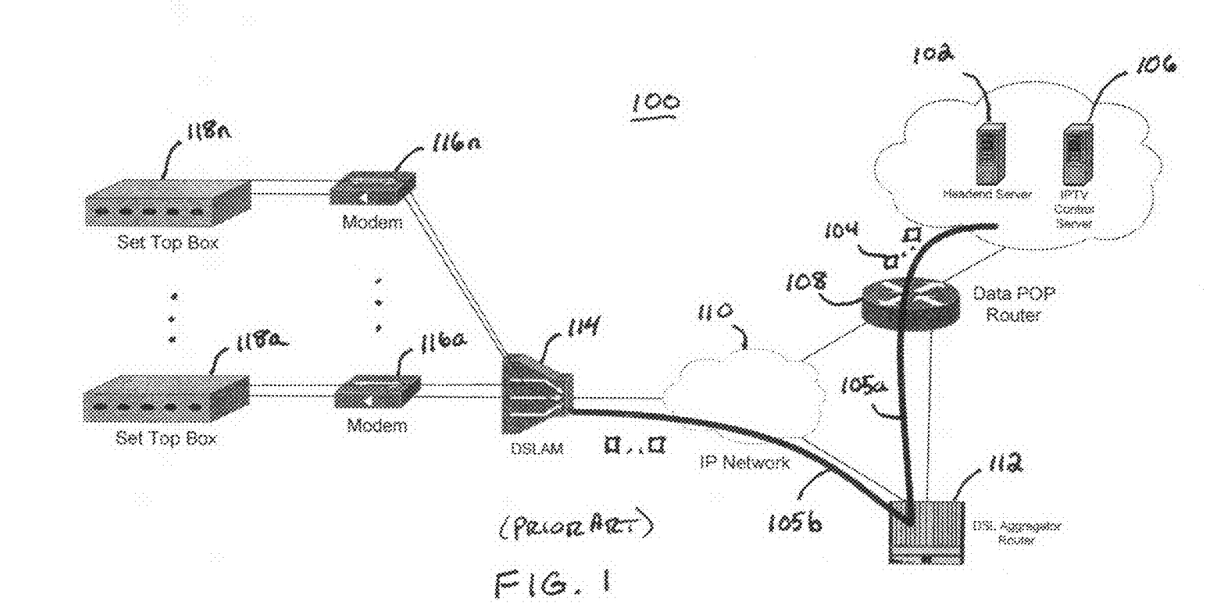
FIG. 1 is an illustration of a convention network configured to deliver IPTV.

With the development of Internet protocol television (IPTV), communication companies are establishing networks for subscribers to watch video content. FIG. 1 is an illustration of a conventional network 100 that is configured to deliver IPTV. As shown, a head-end server 102 is used to store and deliver video content in the form of data packets 104 as data stream 105a and 105b (collectively 105), as understood in the art. An IPTV control server 106 is operable to manage and control the video content being streamed via the data stream 105 over the network 100 to subscribers. A data POP router 108 may be utilized to route the streaming video content to the appropriate locations over an IP network 110 (e.g., the Internet).

A digital subscriber line aggregator router 112 is configured to manage subscribers of a service provider. For example, a database (not shown) may store channel purchase information of a subscriber so that only those channels purchased by the subscriber are routed to that subscriber. As shown, the data stream 105 is communicated from the head-end server 102 via the data POP router 108 to the DSL aggregator router 112. The DSL aggregator router 112 communicates the data stream 105 via the IP network 110 to a DSL access multiplexer (DSLAM) 114. The DSLAM 114 operates to connect subscribers to the IP network 110, hosts video streams/Internet group management protocol (IGMP), and provides QnQ tagging for Ethernet transport of the video content. The DSLAM 114 further operates as a multiplexer to distribute the channels of the video stream 105 to modems 116a-116n (collectively 116) associated with set top boxes 118a-118n (collectively 118).

As with other forms of non-broadcast television, such as satellite and cable, video programming is also provided for subscribers to watch certain programs on certain days and at certain times. The set top boxes 118 are configured to download electronic programming guide (EPG) information from the video stream 105 and allow a subscriber to interact with the set top box 118a via a remote control (not shown) to view an electronic programming guide with the electronic programming guide information stored in the set top box.

While IPTV and other non-broadcast television platforms provide for improved television viewing, there are limitations to IPTV both on the network side and on the subscriber side. On the network side, and especially with IPTV networks, network providers make available a large number of the television channels (e.g., 200 or more channels). Of those channels, IPTV network providers typically continuously stream upwards of half (e.g., 80-100 channels) of the most popular channels to the DSLAM 114 via the data stream 105 to reduce latency for the viewer so that the viewer may "channel surf" as was traditionally done with broadcast television. While latency from the network to the set top box may be reduced by streaming the video programming, the time for the set top box to receive, convert, and display the video programming is still significantly longer than traditional broadcast television. As understood in the art, latency for selecting and displaying a channel is upwards of 2 seconds or more.

A problem with continuously streaming the large number of IPTV channels is the bandwidth needed used by the data being communicated over the network to the DSLAM. While traditional television image display uses bandwidth between 4 and 7 megabits per second (Mbps), high-definition television display uses between 12 and 14 Mbps. To manage the bandwidth being communicated over the network for both traditional and high-definition television display data streams, additional expensive equipment is deployed to handle the large bandwidth needs to meet ever increasing subscriber demand. Older DSLAMs with T1 IMA or DS3 interfaces cost roughly $20,000-$60,000 and can handle 8 Mbs-45 Mbs of bandwidth to service 48-672 customers, newer DSLAMS with OC3 or Gigabit Ethernet interfaces costs about $40,000-$100,000 and can handle 155 Mbs-1000 Mbps of bandwidth to service 672-1024 customers. As more subscribers transition to IPTV, much more equipment will be needed using the current philosophy of continuously streaming the most popular channels via the network to the DSLAMs to make the subscriber experience faster and more enjoyable.

On the subscriber side, subscribers using set top boxes with cable television, satellite television, and IPTV, for example, have the frustrating experience of having a slow channel surfing experience relative to conventional broadcast television. As previously described, the time needed for video programming to be displayed when switching to the channel, either via a programming guide or simply changing a channel using up or down channel selector from a remote control, may be 2 seconds or more. Such time delays, especially when compared to traditional broadcast television, feels like an eternity and weakens the television watching experience.

SUMMARY

To overcome the problem of latency of set top box television, the principles of the present invention provide for downloading images, such as still images or short video clips ("preloaded images"), associated with video programming to a set top box similar to downloading programming guide information so that the images may be displayed to a user prior to the video programming being displayed. In other words, in response to a viewer switching channels, an image may be displayed substantially instantaneously to provide the viewer with a "feel" of watching traditional broadcast television, thereby providing viewers with a more enjoyable television watching experience. By displaying the image, a "channel surfer" viewer may more readily make a decision whether to watch the video programming on the selected channel or switch to another channel before the video programming begins to be displayed.

To overcome the problems of network configurations having to stream large amounts of video content that consumes large amounts of network bandwidth, thereby requiring additional and more expensive network equipment, the principles of the present invention provide for streaming channels over a network to a network to an end-user distribution end-point selected by the end-users. While this network configuration may slightly increase latency for end-users selecting a channel and the video programming actually being displayed, end-users will unlikely notice the increased latency due to being able to view images for faster "surfing" decision-making.

One system for communicating video content to an end-user may include a storage unit configured to store electronic programming guide information and images associated with the electronic programming guide information. An input/output (I/O) unit may be configured to communicate with a network and a processing unit may be in communication with the storage unit and I/O unit. The processing unit may be configured to communicate the electronic programming guide information and images via the network to an electronic device at an end-user.

A method for communicating video content to an end-user may include storing images associated with video programming to be communicated over channels selectably viewable by an end-user on an electronic display. Electronic programming guide information may be communicated to the end-user to enable the end-user to view the electronic programming guide information to determine video programming on the channels. Images associated with the video programming may be communicated to the end-user, where an image may be displayed in response to the end-user selecting a channel to display video programming available for display on the selected channel. In response to the end-user requesting a channel, video programming may be communicated to the end-user to be displayed in place of the displayed image.

A system for displaying video programming to an end-user may include a storage unit configured to store electronic programming guide information and images associated with the electronic programming guide information, an I/O unit configured to communicate with an electronic display and a network, and a processing unit in communication with the storage unit and I/O unit. The processing unit may be configured to receive a request to display a channel, access an image stored on the storage unit, where the accessed image may be associated with video programming currently available on the selected channel, display the accessed image, request video programming currently scheduled on the selected channel via a network and display the video programming scheduled on the selected channel.

The principles of the present invention may further provide for a system for distributing video programming. The system may include a first network device configured to make available and distribute a plurality of channels for end-users to watch, a second network device in communication with the first network device, where the first network device is further configured to communicate a first subset of the channels to the second network device. A third network device may be in communication with the second network device, where the second network device is configured to communicate a second subset of channels matching channels selected to be viewed by the end-users. The third network device may be configured to receive the second subset of channels and distribute the second subset of channels to respective end-users for viewing video programming.

A method in accordance with the principles of the present invention may include making available a plurality of channels having video programming for end-users to watch. A first subset of the channels may be to a first network device. Channels being viewed by the end-users may be determined. A second subset of channels may be established from the first subset of channels, where the second subset of channels may be established by the channels being viewed by the end-users. The second subset of channels may be communicated from the first network device to a second network device, where the second network device may be configured to distribute channels of the second subset of channels to respective end-users.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 2:
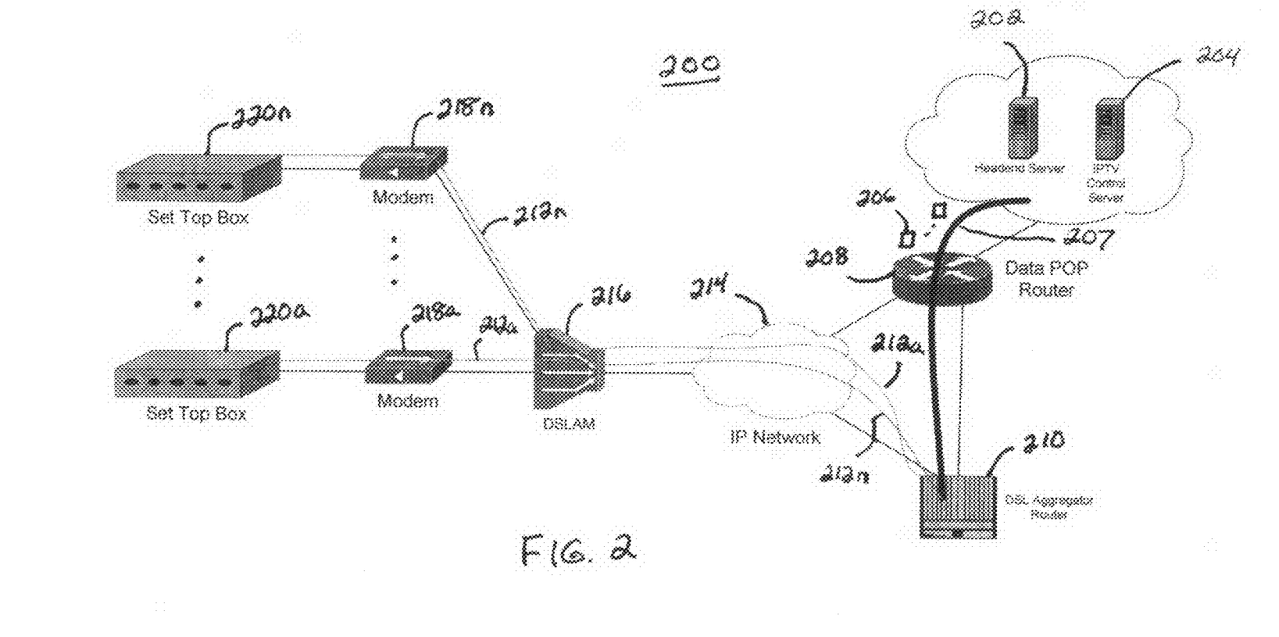
FIG. 2 is an illustration of an exemplary network configured to deliver IPTV in accordance with the principles of the present invention.

FIG. 2 is an illustration of an exemplary network 200 configured to deliver IPTV in accordance with the principles of the present invention. A head-end server 202 and IPTV control server 204, which are components that may form video head-end equipment, may be configured to control, store, and communicate video programming in the form of data packets 206 in a data stream 207 to a data POP router 208. The data stream 207 may include the most popular channels, such as 40-50 percent of available channels, as is performed in conventional IPTV networks. The data stream 207 may be communicated from the data POP router 208 to a DSL aggregator router 210. In one embodiment, the DSL aggregator router 210 is configured to receive the data stream 207 including the video programming and communicate channels currently requested from subscribers and data streams 212a-212n (collectively, requested data streams 212) via IP network 214 to DSLAM 216. The DSLAM 216, in response to receiving the requested video programming on the data streams 212, may communicate the data streams of respectively requested channels to modems 218a-218n (collectively 218) for delivery to set top boxes 220a-220n (collectively 220).

By limiting communication of channels over the network 214 to those channels that are currently being requested, bandwidth capabilities across the network 214 and network equipment (e.g., DSLAM 216) may be lowered. It should be understood that the network devices (i.e., head-end server 102, data POP router 108, DSL Aggregator router 112, and DSLAM 114) are exemplary and that alternative or combined network devices may be utilized to perform the same or similar functionality in accordance with the principles of the present invention. If, for example, a low number of channels are being requested by subscribers, then a limited number of channels communicated in data streams 212 are communicated from the DSL aggregator router 210 to the DSLAM 216 for communication to the set top boxes 220. Because a more limited number of data streams 212 may be delivered via the network 214 to the DSLAM 216, a more cost effective DSLAM may be utilized to accommodate distribution of video programming to end-users. One reason for all of the video programming in the data stream 207 not having to be communicated to the DSLAM 216 is due to the principles of the present invention enabling end-users to be able to view an image associated with video programming on each channel. By being able to view the images, delay in the video programming while "channel surfing" is less noticeable and the end-user is able to instantly determine whether he or she wants to remain on a particular channel based on the images being displayed when surfing the available channels.

Figure 3:
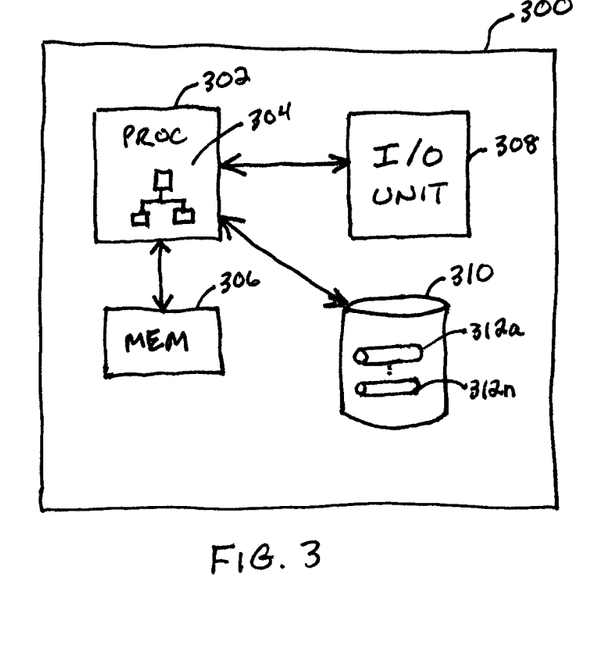
FIG. 3 is a block diagram of an exemplary device utilized to deliver video programming to an end-user.

FIG. 3 is a block diagram of an exemplary system 300 device utilized to deliver video programming to an end-user (e.g., subscriber). The system 300 may be generally representative of a number of systems utilized to deliver video programming and images associated therewith to end-users. For example, the system 300 may represent a head-end server 102, IPTV control server 106, DSL aggregator router 112, and/or set top box 118. In other words, each of these systems may include the components shown in the system 300 of FIG. 3, but use different specific components and software configured to perform different functionality, as understood in the art. As shown, the system 300 includes a processing unit 302, which may be formed of one or more processors, that executes software 304. The software, depending upon the system functionality, may be configured to store and (i) manage information, such as video programming information and images, (ii) manage routing of video streams, or (iii) manage interaction with an end-user to download video programming and images for display on a television or other electronic display.

The processing unit 302 may be in communication with a memory 306. The memory 306 may be a random access memory (RAM), flash memory, or any other memory type. The processing unit 302 may also be in communication with an input/output (I/O) unit 308 that is configured to communicate with a television or other electronic display, remote control, network or other devices, such as digital video disc (DVD), digital video recorder (DVR), or any other local or network located device. The processing unit 302 may additionally be in communication with a storage unit 310 that is configured to store files in data repositories 312a-312n (collectively 312). The data repositories 312 may store electronic programming guide information and images associated with video programming listed in the video programming guide information. The images may be still images, graphic images, text images, low data moving images or other image that may provide a graphical or textual representation to end-users who may be channel surfing and desire to know what video program is on a particular channel without having to wait for the video programming to begin playing, generally about 2 seconds or more after selecting a channel, or use the programming guide.

In accordance with the principles of the present invention, an end-user may use an up and down channel selector on a remote control to switch the channel upwards or downwards. Within a timeframe consistent with conventional broadcast television, a set top box may substantially instantaneously display an image associated with a video program currently being communicated on a selected channel. For example, if an end-user is "flipping" through channels in a "channel surf" mode, then upon selecting a channel that is showing a program, such as The Dukes of Hazard, an image showing Luke, Bo, Daisy Duke, and the General Lee sports-car may be displayed in a still image so that the end-user may quickly determine that he or she is either interested or not interested in watching The Dukes of Hazard and remain on the channel or surf from the selected channel to another channel. The image may be displayed on the television until the video programming begins to be displayed on the television via the set top box or the user switches from the selected channel to another channel prior to the video programming beginning display. This display of an image associated with video programming on each channel makes the television watching experience more enjoyable as users may determine whether or not to watch a selected channel without having to wait for the video programming to start being displayed or use the programming guide.

Figure 4:
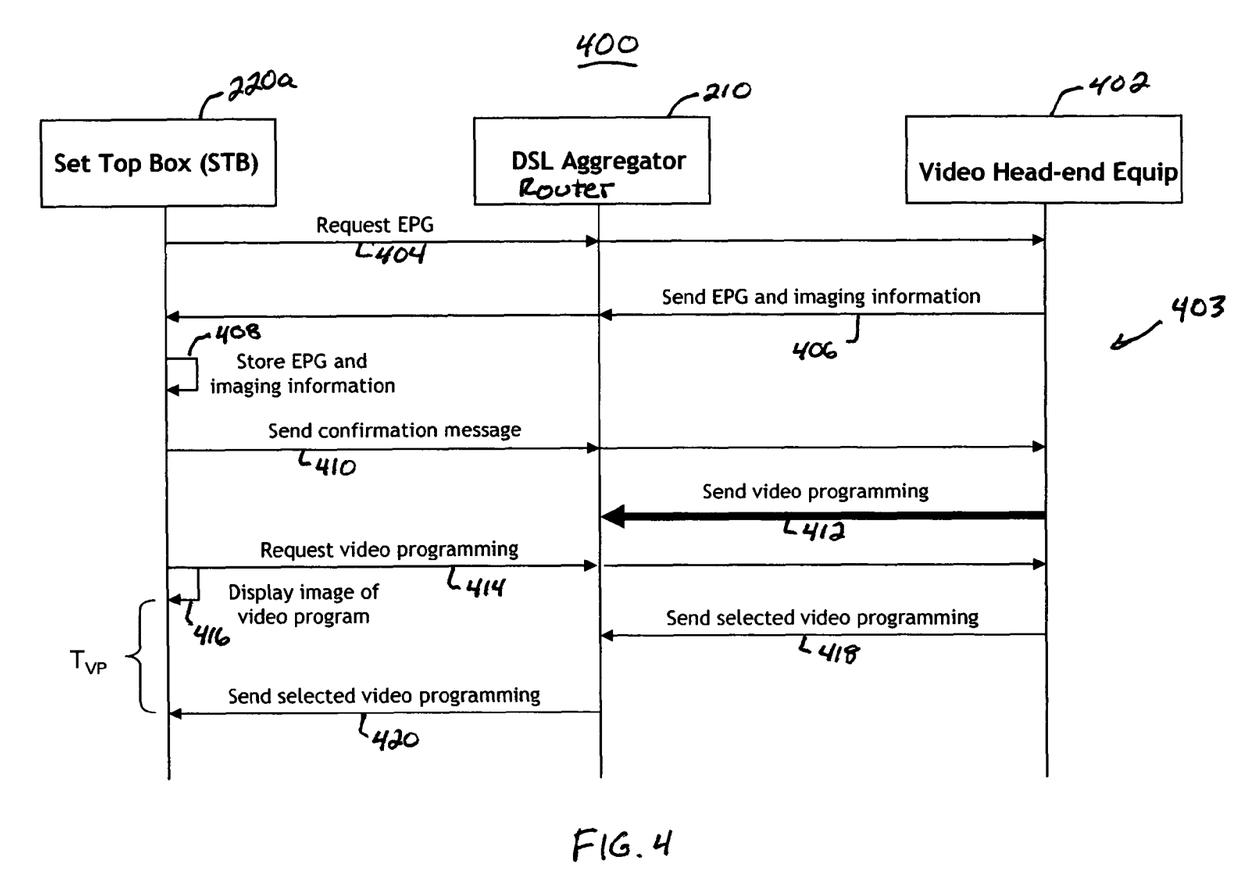
FIG. 4 is a signal diagram illustrating an exemplary process for delivering video programming to an end-user.

FIG. 4 is a signal diagram illustrating an exemplary process 400 delivering video programming to an end-user. Three different devices are shown, including a set top box 220a, DSL aggregator router 210, and video head-end equipment 402. Signals 403 may be communicated between each of the devices. At step 404, a request electronic programming guide (EPG) signal may be communicated from the set top box 220 to DSL aggregator router 210. The DSL aggregator router 210 may, in response, communicate the request EPG signal 404 to the video head-end equipment 402. The video head-end equipment 402, in response, may access and communicate EPG and imaging information via the DSL aggregator router 210 to the set top box 220*a*. The set top box 220*a* may store the electronic programming guide and imaging information at step 408. At step 410, a confirmation message may be sent from the set top box 220*a* to the video head-end equipment 402 via the DSL aggregator router 210 to notify the video head-end equipment 402 that the EPG and imaging information was successfully received and stored on the set top box 220*a*.

At step 412, video programming may be communicated to the DSL aggregator router 210. The video programming may be communicated in one or more data streams. In one embodiment, the video programming may include about half or more of the channels available to be accessed by end-users so that end-users may more quickly receive the video programming upon selection of one of the channels being streamed to the DSL aggregator router 210. Alternatively, the video head-end equipment 402 may not send half of the channels to the DSL aggregator 210 that are currently available, but rather wait until a channel request is received from set top boxes of end-users and communicate the specific channels being requested. These streaming techniques are possible because the end-users may view images stored at the set top boxes that represent the video programming currently being delivered on each channel, thereby making the end-users less concerned about time for the video programming to start being displayed.

At step 414, a request for video programming may be communicated from the set top box 220*a* to the DSL aggregator router 210 in response to receiving a request from the end-user from a remote control to select a channel. The channel request may come from the end-user pressing an up or down channel selector, typing in a channel number, or selecting a channel via the electronic programming guide. The video programming requests may be communicated from the DSL aggregator router 210 to the video head-end equipment 402. The set top box 220*a* may substantially simultaneously begin displaying an image of the video programming that is stored at the set top box 220*a* at step 416. Displaying the image may be performed substantially instantaneously such that the end-user may make a decision to remain on the channel or switch channels prior to the video programming starting on the channel. Being "substantially instantaneous" means to be an unnoticeable or unperceivable time to a view for an image to be displayed in response to selecting a channel to watch. At step 418, the video head-end equipment 402 may send an instruction to the DSL aggregator router 210 to send selected video programming from the DSL aggregator router 210 to the set top box 220*a* at step 420. A time $T_{VP}$ defining the time between the image of the video program being displayed at 416 and the video programming being received at the set top box 220*a* at step 420 may be approximately 2 seconds, which is more than enough time for a "channel surfer" with any skill to determine whether or not to switch channels. It should be understood that while FIG. 4 is configured to show communication of IPTV over a network the principles of the present may be utilized on cable and satellite networks as well. In other words, by providing images at the set top box of video programming delivery systems, "channel surfers" may be able to view images associated with video programming on each channel and make a decision as to whether or not to change channels. It should noted that images associated with adult programming may show PG rated images so that children are not exposed to improper images.

Figure 5:
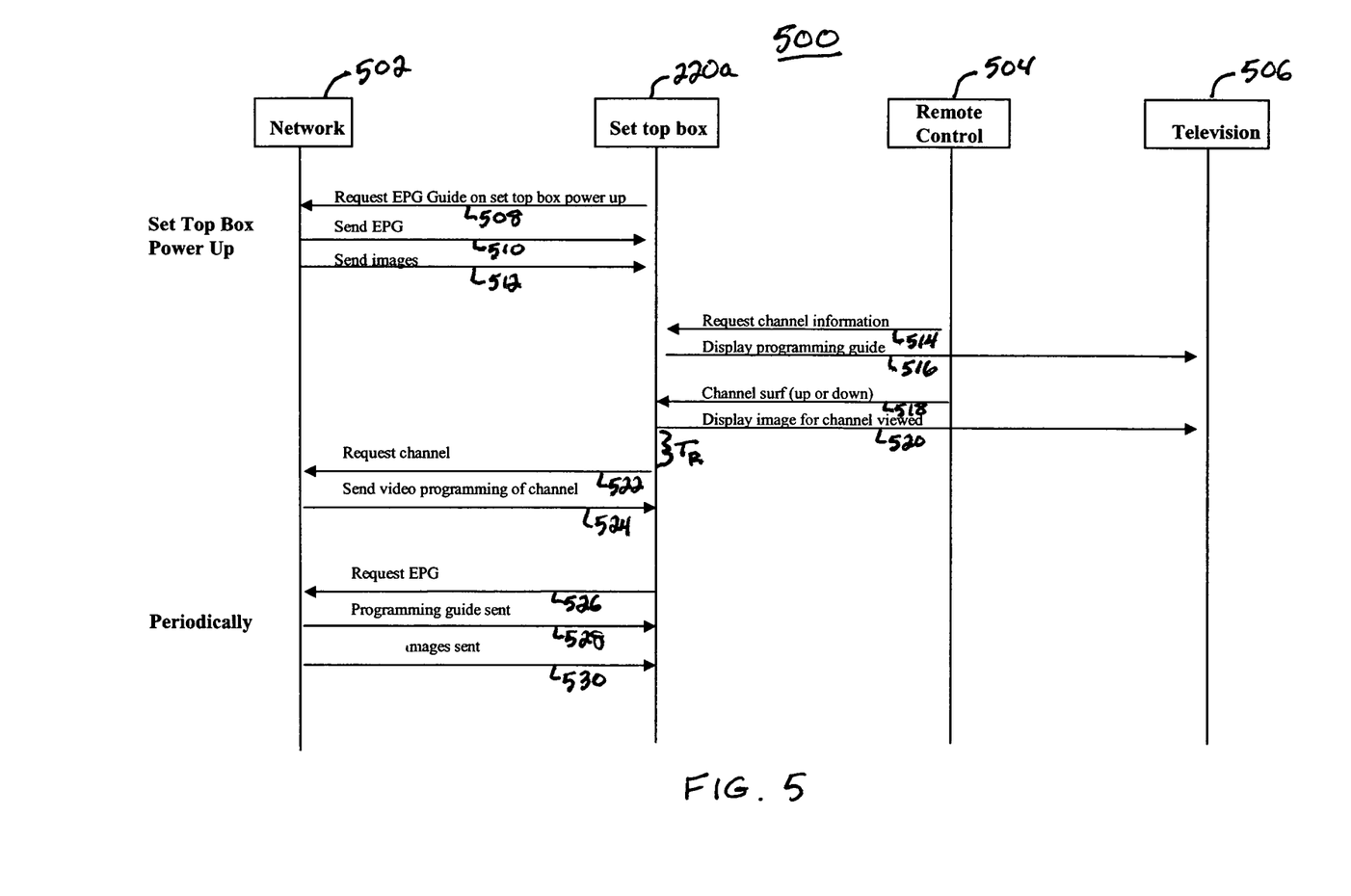
FIG. 5 is a signal diagram of an exemplary process for set top box operation.

FIG. 5 is a signal diagram of an exemplary process 500 for set top box operation. The process 500 provides for downloading of electronic programming guide and associated images to be downloaded from a network 502 to a set top box 220*a*. A remote control 504 and television 506 may be located at a location of an end-user. The process starts at step 508, where a request for electronic programming guide information may be communicated to the network 502 in response to the set top box 220*a* being powered up. At step 510, the electronic programming guide information may be communicated via the network 502 to the set top box 220*a* for storage therein. Images may be communicated via the network 502 to the set top box 220*a* at step 512. Alternatively, steps 510 and 512 may be combined into a single step, where both the electronic programming guide information and images are sent. The set top box may store the electronic programming guide information and images in such a manner as to cause an image associated with a video program to be displayed on the television 506 when a channel displaying video programming associated with the image is selected by the end-user.

At step 514, the end-user may use the remote control 504 to request channel information from the set top box 220*a*. The set top box 220*a* may display programming guide information at step 516 to the television 506. At step 518, the end-user may use the remote control 504 to press the up and down channel selectors to "channel surf." At step 520, the set top box 220*a* may display an image associated with video programming on the channel selected to be viewed to the television 506. A channel selection request may be communicated from the set top box 220*a* to the network 502 at step 522. At step 524, via programming on the selected channel may be sent via the network 502 to the set top box 220*a* at step 524. Of course, if the end-user continues to "surf," then the set top box 220*a* may not request the channel selection.

In one embodiment, a predetermined request time delay, rather than staying on the selected channel, such as 0.3 seconds, may be used to delay requesting the channel via the network 502 to provide the user with additional time for the end-user to decide whether or not to continue switching channels. This time delay $T_R$ may be varied or dynamic based on past use by the end-user. The time delay may reduce unnecessary set-up processing by network equipment and communication of data streams in the event that the "channel surfer" is slow to make decisions to switch channels that he or she does not intend to watch in response to viewing an image associated with the video programming.

In order to ensure that the set top box 220*a* has up-to-date electronic programming guide information and images associated with programming on each of the channels, the set top box 220*a* may be configured to request electronic programming guide information and images for storage in the set top box 220*a* on a periodic basis. For example, the request for the electronic programming guide information and images may be sent every hour, two hours, or longer, depending on the amount of memory in the set top box 220*a*. The images may have any format, such as JPEG, MPEG, or any other electronic format that may enable the set top box 220*a* to display an image to the end-user for determining the programming available on each channel.

Figure 6:
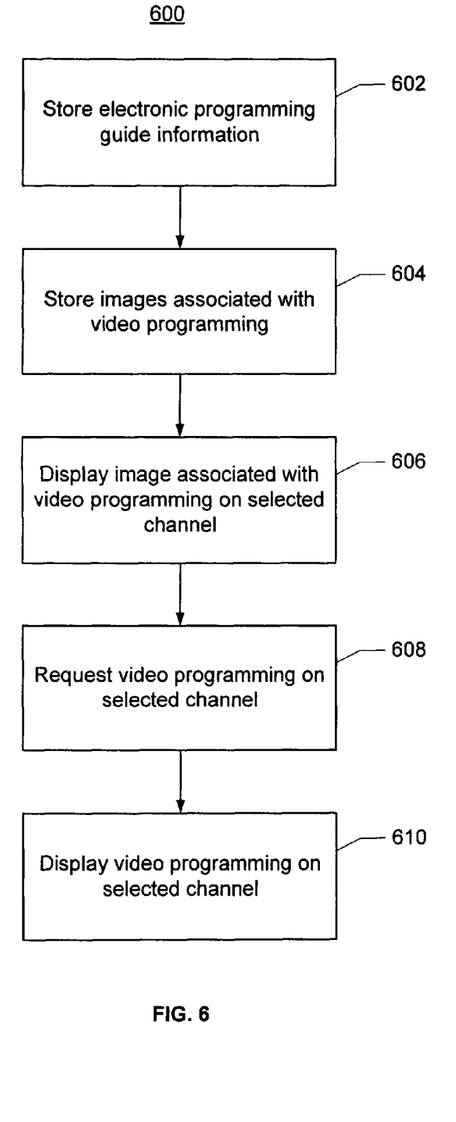
FIG. 6 is a flow chart of another exemplary process for set top box operation.

FIG. 6 is a flow chart of another exemplary process 600 for set top box operation. The process may start at step 602, where electronic programming guide information may be stored. Images associated with video programming identified in the electronic programming guide may be stored at step 604. In one embodiment, the electronic programming guide information and associated images may be received at power-up of the set top box and periodically during operation of the set-top box. Storage of the electronic programming guide information and images may be performed substantially simultaneously. One or more data repositories, such as a relational database, may be used for storing the electronic programming guide information and associated images. For example, the information and images may be received every 4 hours. This time may be based on the size of memory in the set top box. At step 606, an image associated with video programming may be displayed on a selected channel. Displaying the image may be performed substantially instantaneously. The image may be a still image, such as a title page, or any other image representative of video programming currently available to be watched on the selected channel. At step 608, video programming on the selected channel may be requested. The request for the video programming may be delayed for a predetermined time period (e.g., 0.3 seconds). In one embodiment, the request may be to a head-end server over a network such as the Internet, Ethernet network or satellite network. In response to receiving the video programming on the selected channel, the video programming may be displayed in place of the image.

Figure 7:
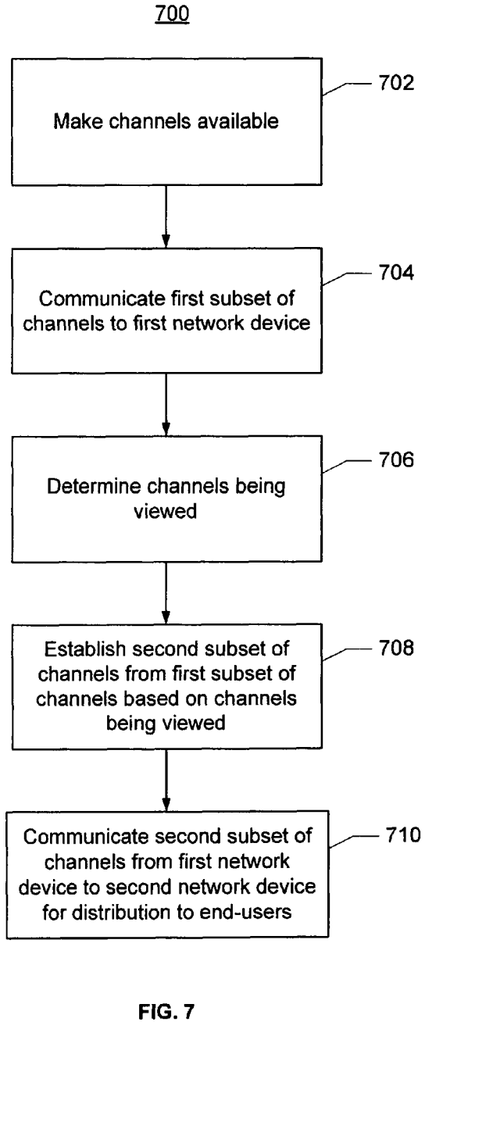
FIG. 7 is a flow chart of an exemplary process for network operation for delivering video programming to end-users.

FIG. 7 is a flow chart of an exemplary process 700 for network operation for delivering video programming to end-users. The process 700 starts at step 702, where channels of video programming are made available for end-users to watch. At step 704, a first subset of channels is communicated to a first network device. The first network device may be a router. At step 706, a determination of channels being viewed may be made. At step 708, a second subset of channels may be established from the first subset of channels based on the determination of the channels being viewed. The second subset of channels may be communicated from the first network device to a second network device for distribution to end-users at step 710. In one embodiment, the second network device is a DSLAM. In addition, electronic programming guide information and images associated with the electronic programming guide information may be communicated to the end-users. The electronic programming guide information and images may be stored at an electronic device of the end-user. In one embodiment, the process 700 is utilized to distribute IPTV channels. Alternatively, the process 700 may be used for cable or satellite television systems. Although the principles of the present invention have been described in association with set top boxes, it should be understood that the set top box functionality may be incorporated into the television or network and use the principles of the present invention in the same or similar manner.

Although particular embodiments of the present invention have been explained in detail, it should be understood that various changes, substitutions, and alterations can be made to such embodiments without departing from the spirit and scope of the present invention as defined solely by the following claims.

We claim:

1. A system for displaying video programming to an end-user, said system comprising:
   a storage unit configured to store electronic programming guide information and images associated with the electronic programming guide information;
   an I/O unit configured to communicate with an electronic display and a network; and
   a processing unit in communication with said storage unit and I/O unit, and configured to:
      display a first video programming associated with a first channel on a display unit;
      receive a request to switch from viewing the first video programming associated with the first channel to viewing a second video programming associated with a second channel;
      responsive to receiving the request to switch from viewing the first channel to the second channel, tuning the set-top box from the first channel to the second channel;
      responsive to tuning the set-top box to the second channel retrieving a locally stored image associated with the second video programming; and
      display the locally stored image associated with the second video programming on the display unit, wherein the locally stored image associated with the second video programming remains displayed on the display unit until one of a request to switch channels is received or until the second video programming associated with the second channel is requested via a network and received after a dynamic request time delay between the time a channel is selected with the remote control and the time video programming associated with the selected channel is requested via the network and displayed on the display unit, wherein the dynamic request time delay varies the length of the time delay based upon past use by an end user.

2. The system according to claim 1, wherein the locally stored image is a frame of video.

3. The system according to claim 1, wherein said processing unit is further configured to request updated electronic programming guide information and images periodically.

4. A method for fast channel surfing, said method comprising:
   displaying, using a set top box, a first video programming associated with a first channel on a display unit;
   receiving, at the set-top box, a request to switch from viewing the first video programming associated with the first channel to viewing a second video programming associated with a second channel;
   responsive to receiving the request to switch from viewing the first channel to the second channel, tuning the set-top box from the first channel to the second channel;
   responsive to tuning the set-top box to the second channel, retrieving a locally stored image associated with the second video programming; and
   displaying the locally stored image associated with the second video programming on the display unit, wherein the locally stored image associated with the second video programming remains displayed on the display unit until one of a request to switch channels is received or until the second video programming associated with the second channel is requested via a network and received after a dynamic request time delay between the time a channel is selected with the remote control and the time video programming associated with the selected channel is requested via the network and displayed on the display unit, wherein the dynamic request time delay varies the length of the time delay based upon past use by an end user.

5. The method according to claim 4, wherein displaying the locally stored image includes displaying a still image.

6. The method according to claim 4, wherein displaying the image is performed substantially instantaneously in response to tuning the set-top box from the first channel to the second channel.

* * * * *